United States Patent
Huang et al.

(10) Patent No.: US 10,823,933 B2
(45) Date of Patent: Nov. 3, 2020

(54) OPTICAL ELEMENT DRIVING MECHANISM

(71) Applicant: TDK TAIWAN CORP., Yangmei Taoyuan (TW)

(72) Inventors: Chien-Lun Huang, Yangmei Taoyuan (TW); Yu-Cheng Lin, Yangmei Taoyuan (TW); Fu-Yuan Wu, Yangmei Taoyuan (TW); Chen-Chi Kuo, Yangmei Taoyuan (TW); Sheng-Zong Chen, Yangmei Taoyuan (TW)

(73) Assignee: TDK Taiwan Corp., Yangmei Taoyuan (TW)

( * ) Notice: Subject to any disclaimer, the term of this patent is extended or adjusted under 35 U.S.C. 154(b) by 135 days.

(21) Appl. No.: 15/935,431

(22) Filed: Mar. 26, 2018

(65) Prior Publication Data
US 2018/0284386 A1    Oct. 4, 2018

Related U.S. Application Data

(60) Provisional application No. 62/478,193, filed on Mar. 29, 2017.

(30) Foreign Application Priority Data

Mar. 7, 2018  (CN) .......................... 2018 1 0187784

(51) Int. Cl.
| | |
|---|---|
| *G02B 7/09* | (2006.01) |
| *G03B 3/10* | (2006.01) |
| *G02B 7/08* | (2006.01) |
| *H02K 41/035* | (2006.01) |
| *G03B 13/36* | (2006.01) |

(52) U.S. Cl.
CPC ................. *G02B 7/09* (2013.01); *G02B 7/08* (2013.01); *G03B 3/10* (2013.01); *G03B 13/36* (2013.01); *G03B 2205/0069* (2013.01); *H02K 41/0354* (2013.01)

(58) Field of Classification Search
CPC . G02B 7/08; G02B 7/09; G03B 13/36; G03B 2205/0069; G03B 3/10; H02K 41/0354
See application file for complete search history.

(56) References Cited

U.S. PATENT DOCUMENTS

| | | | |
|---|---|---|---|
| 2011/0217029 A1* | 9/2011 | Wu ........................ | G03B 17/00 396/55 |
| 2012/0057252 A1* | 3/2012 | Ishiguro ................... | G02B 7/08 359/824 |

* cited by examiner

*Primary Examiner* — Joseph P Martinez
*Assistant Examiner* — Vipin Patel
(74) *Attorney, Agent, or Firm* — Muncy, Geissler, Olds & Lowe, P.C.

(57) ABSTRACT

A driving mechanism is provided and drives an optical element. The driving mechanism includes a holding unit, a base unit, an elastic element, and a driving assembly. The holding unit holds an optical element. The base includes a body and a connecting component. The connecting component is formed in the body by insert molding, and has a first contact and a second contact. The first contact and the second contact are located on different sides of the base, and the first contact is electrically connected to a base unit outside the driving mechanism. The elastic element connects the holding unit to the base, and the second contact is electrically connected to the elastic elements. The driving mechanism drives the optical element to move relative to the base.

20 Claims, 12 Drawing Sheets

OPTICAL ELEMENT DRIVING MECHANISM

CROSS REFERENCE TO RELATED APPLICATIONS

This application claims the benefit of U.S. Provisional Application No. 62/478,193, filed Mar. 29, 2017, and claims priority of China Patent Application No. 201810187784.1, filed Mar. 7, 2018, the entirety of which are incorporated by reference herein.

BACKGROUND

Technical Field

The disclosure relates to an optical element driving mechanism, and in particular to an optical element driving mechanism in which the positions of the electrical contacts are separate.

Description of the Related Art

In the process of manufacturing optical element driving mechanisms, multiple welding steps are usually performed to connect the electrical contacts of the circuits in the driving mechanism with different electronic elements. In various welding steps, contacts that have already been welded may be affected by subsequent welding steps and become detached due to the application of heat. In addition, when mounted on the electronic product, the driving mechanism may become damaged due to excessive mounting strength.

BRIEF SUMMARY

Some embodiments of the disclosure provide a driving mechanism which drives an optical element. The driving mechanism includes a holding unit, a base unit, an elastic element, and a driving assembly. The holding unit holds the optical element. The base unit includes a body and a connecting member, wherein the connecting member is formed in the body by insert molding. The connecting member has a first contact and a second contact. The first contact and the second contact are located on different sides of the base unit, and the first contact is electrically connected to a circuit unit outside the driving mechanism. The elastic element connects the holding unit to the base unit, wherein the second contact is electrically connected to the elastic element. The driving assembly is electrically connected to the connecting member, and drives the optical element to move relative to the base unit.

In an embodiment, the first contact and the second contact are located on opposite sides of the base unit.

In an embodiment, the driving mechanism further includes a housing, wherein the base unit further includes a contact member, and the contact member is in contact with the housing.

In an embodiment, the connecting member further includes a circuit portion, wherein the circuit portion is electrically connected to the elastic element, and is electrically isolated from the contact member.

In an embodiment, when observed from a bottom surface of the base unit, the contact member protrudes from the body, and the contact member does not exceed the range of the housing.

In an embodiment, the contact member and the housing are bonded by welding or soldering.

In an embodiment, a distance between the first contact and the second contact in a direction perpendicular to an optical axis of the optical element is greater than half of the length of the shortest side of the base unit.

In an embodiment, the connecting member further includes a strengthening portion connected to the circuit portion, and the strengthening portion extends along an optical axis direction of the optical element.

In an embodiment, the base unit further includes a protruding structure disposed on the body, and the strengthening portion is embedded in the protruding structure.

In an embodiment, the body is a plastic material, and the connecting member is a metallic material.

Some embodiments of the disclosure provide a base unit, including a body and a connecting member. The connecting member is disposed on the body, wherein the connecting member further includes a circuit portion disposed in the body. The circuit portion has a first side and a second side. The first contact is disposed on the first side of the circuit portion. The second contact is disposed on the second side of the circuit portion.

In an embodiment, the first side and the second side are adjacent or opposite sides.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The optical element driving mechanisms of some embodiments of the present disclosure are described in the following description. However, it should be appreciated that the following detailed description of some embodiments of the disclosure provides various concepts of the present disclosure which may be performed in specific backgrounds that can vary widely. The specific embodiments disclosed are provided merely to clearly describe the usage of the present disclosure by some specific methods without limiting the scope of the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

Figure 1:
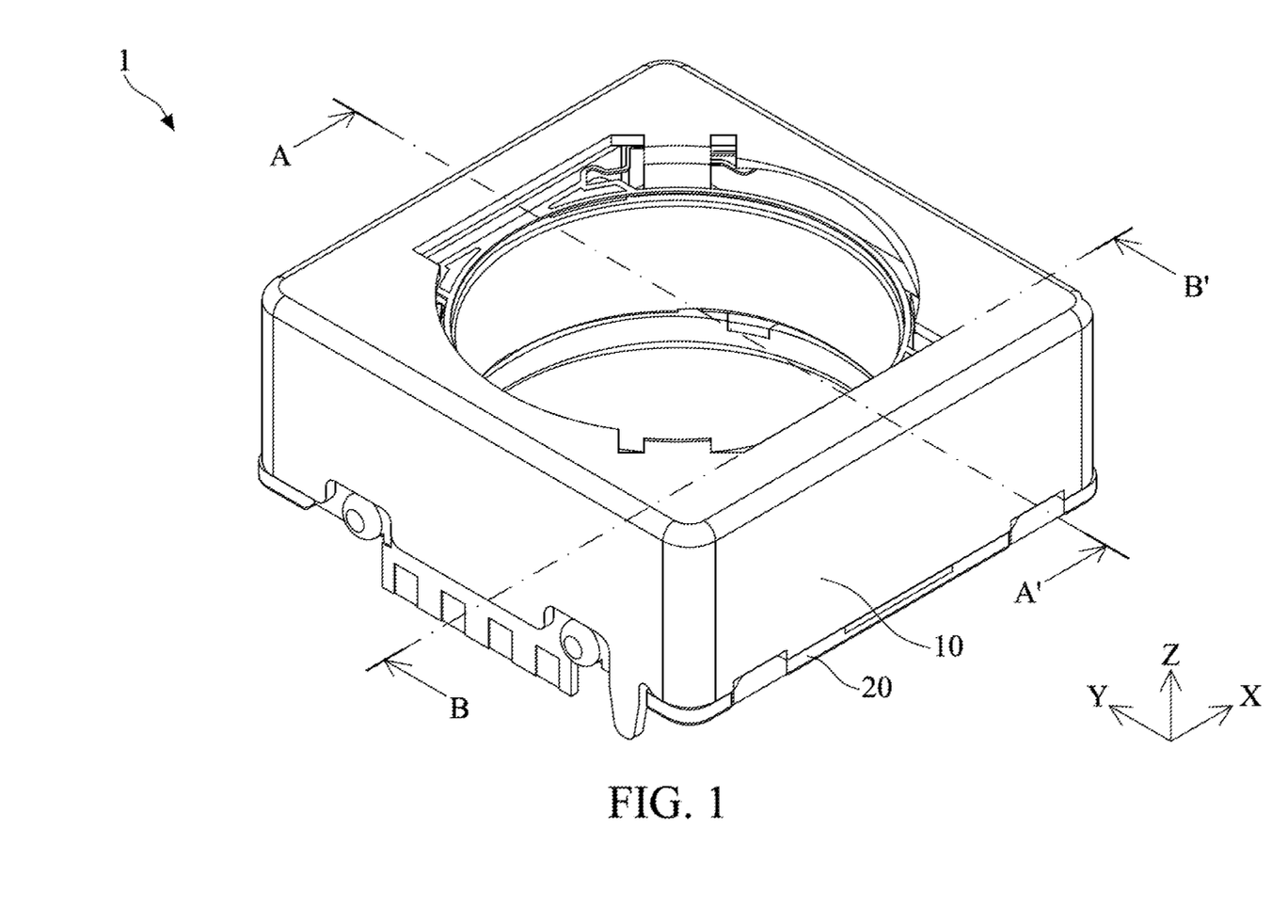
FIG. 1 is a schematic perspective view illustrating an optical element driving mechanism in accordance with an embodiment of the present disclosure.
Figure 2:
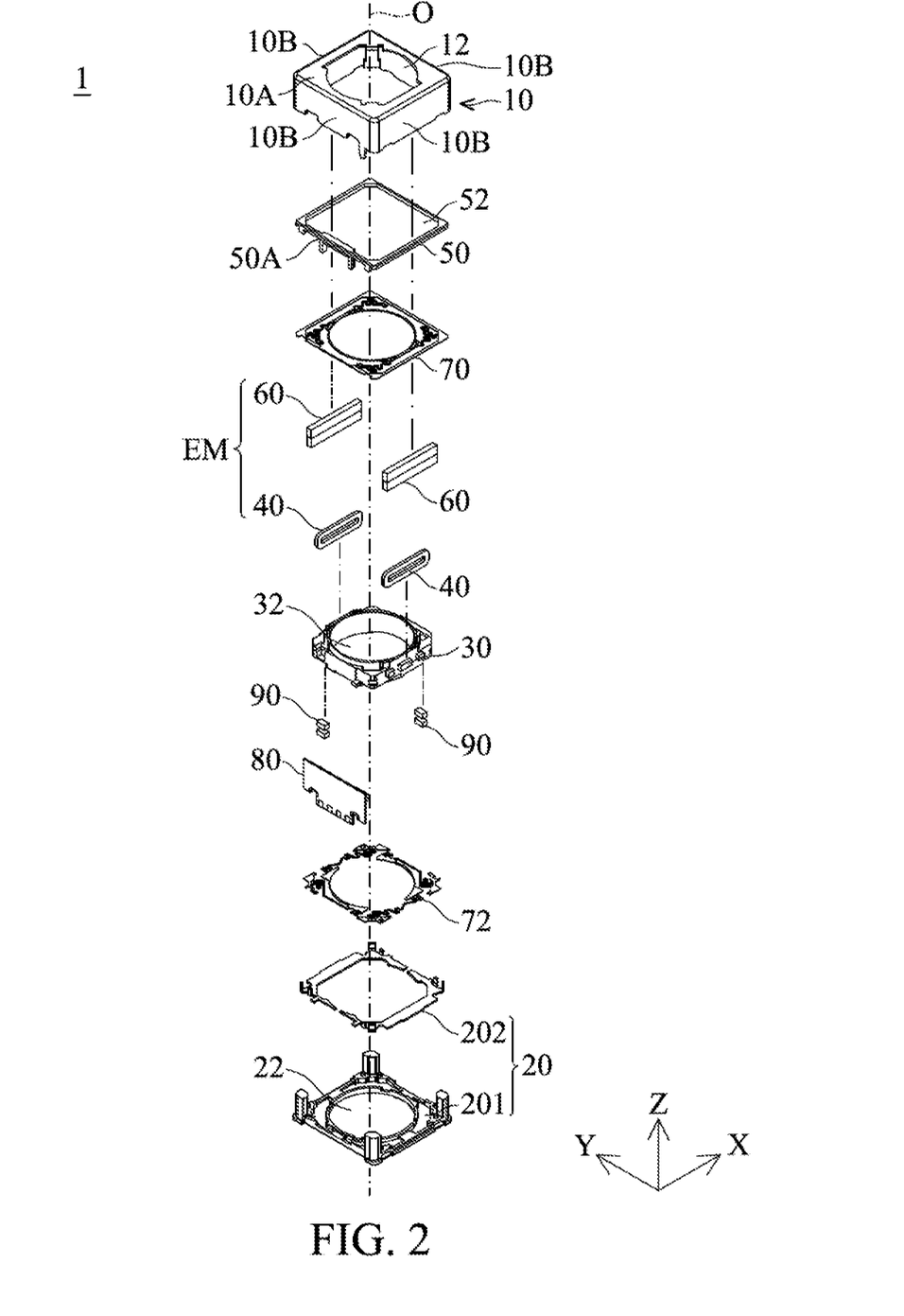
FIG. 2 is an exploded view illustrating the optical element driving mechanism in FIG. 1.
Figure 3A:
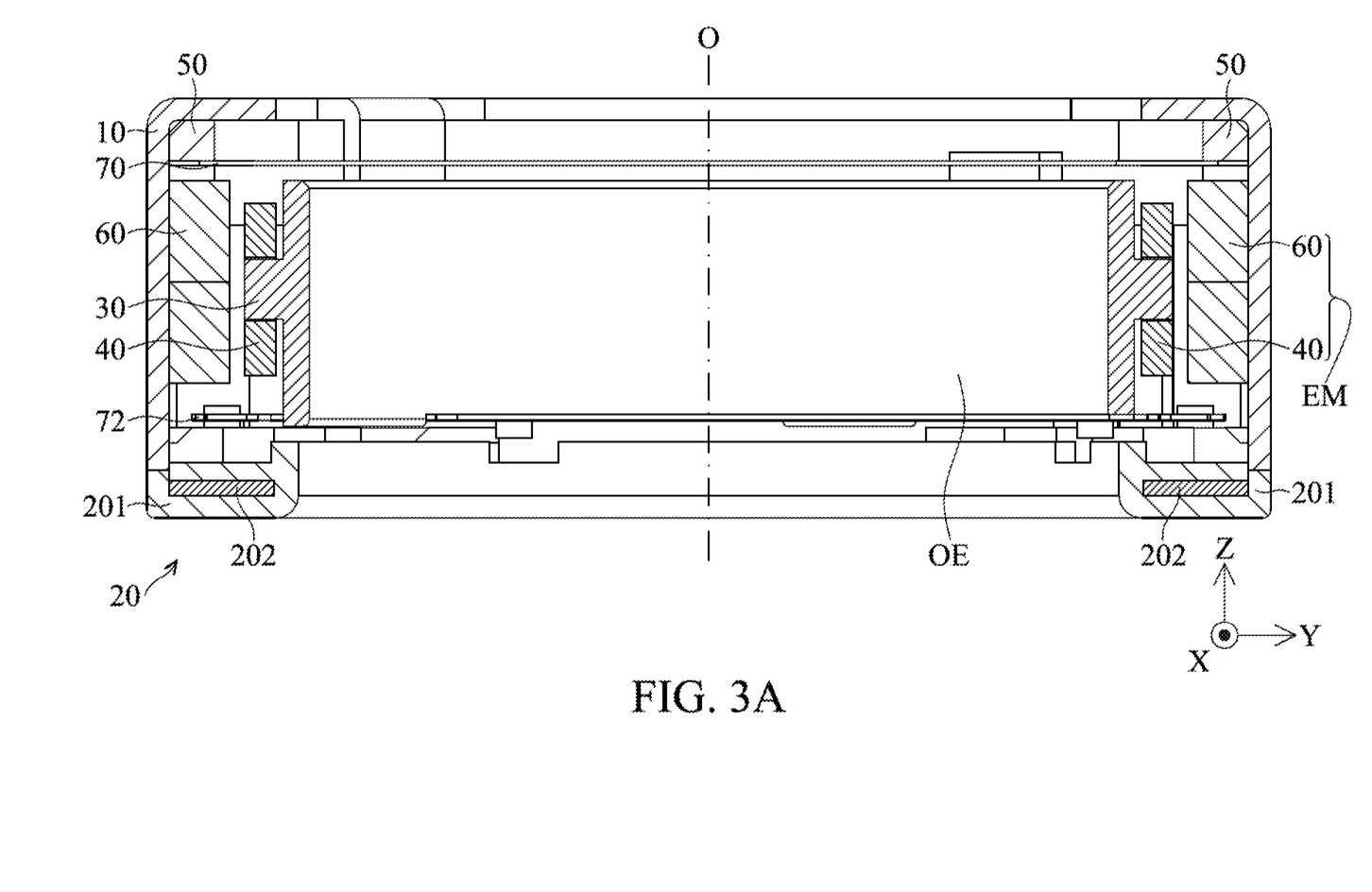
FIG. 3A is a cross-sectional view illustrating the optical element driving mechanism along line A-A' in FIG. 1.
Figure 3B:
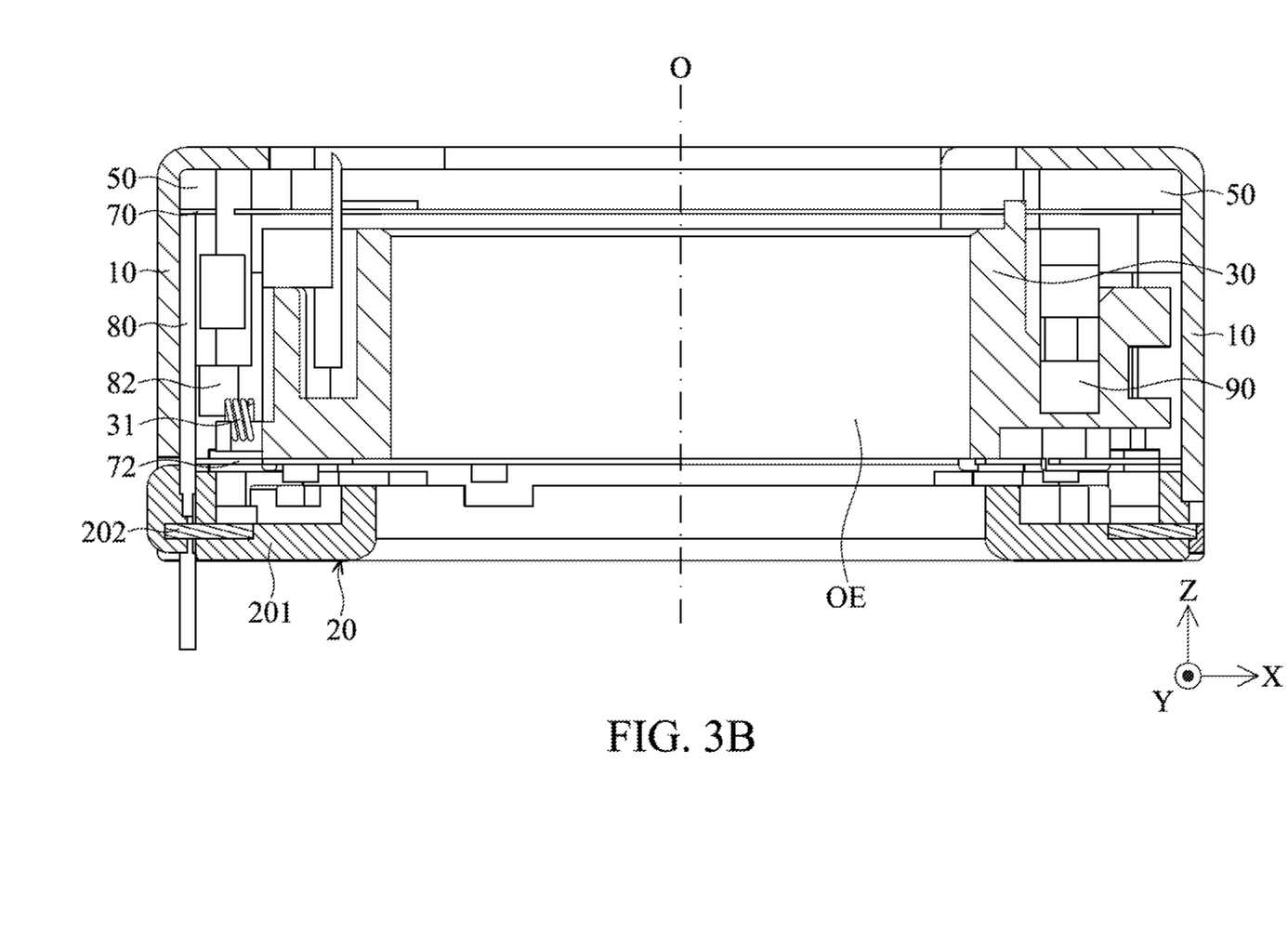
FIG. 3B is a cross-sectional view illustrating the optical element driving mechanism along line B-B' in FIG. 1.

Referring to FIGS. 1 to 3B, wherein FIG. 1 is a schematic perspective view illustrating an optical element driving mechanism 1 in accordance with an embodiment of the present disclosure, FIG. 2 is an exploded view illustrating the optical element driving mechanism 1 in FIG. 1, FIG. 3A is a cross-sectional view illustrating the optical element driving mechanism 1 along line A-A' in FIG. 1, and FIG. 3B is a cross-sectional view illustrating the optical element driving mechanism 1 along line B-B' in FIG. 1. It should be noted that, in this embodiment, the optical element driving mechanism 1 may be, for example, a voice coil motor (VCM), which may be disposed in the electronic devices with camera function, may be configured to drive an optical element, and can perform an auto-focusing (AF) function.

As shown in FIGS. 1 to 3B, the optical element driving mechanism 1 has a substantial rectangular structure, which mainly includes a housing 10, a base unit 20, a holding unit 30, a plurality of driving coils 40, a frame 50, a plurality of magnetic elements 60, an upper leaf spring 70, a lower leaf spring 72, a circuit board 80, and a sensing magnet 90. In this embodiment, the housing 10 is a metallic material. The circuit board 80 is electrically connected to the driving coils 40, and the circuit board 80 is configured to transmit electrical signals to the driving coils 40.

The housing 10 has a hollow structure, which has a top wall 10A, and four sidewalls 10B, and the housing 10 can be connected to the base unit 20. It should be appreciated that openings 12 and 22 are respectively formed on the housing 10 and the base unit 20. The center of the opening 12 corresponds to an optical axis O of an optical element OE (See FIGS. 3A and 3B). The opening 22 corresponds to an image-sensing element (not shown) disposed outside the optical element driving mechanism 1, and thereby the optical element OE (such as an optical lens) disposed in the optical element driving mechanism 1 can perform a focusing function with the image-sensing element in the direction of the optical axis O. It should be note that the term "the direction of the optical axis O", which may also be referred to as "the optical axis O direction", means the direction that is along the optical axis O or parallel to the optical axis O in the following description.

The base unit 20 includes a body 201 and a connecting member 202. For example, the body 201 is a plastic material, and the connecting member 202 is a metallic material. In this embodiment, the connecting member 202 is electrically connected to a circuit unit (not shown) disposed outside the optical element driving mechanism 1, and the connecting member 202 is configured to perform an auto-focusing (AF) function. In addition, the body 201, which is a plastic material, covers an external side of the connecting member 202 by insert molding.

The holding unit 30 has a hollow structure, and a through hole 32 is formed therein, wherein the optical element OE (See FIGS. 3A and 3B) is secured in the through hole 32. The frame 50 has an opening 52 and a recess 50A, wherein the circuit board 80 may be fixed in the recess 50A. In this embodiment, the circuit board 80 is electrically connected to the circuit unit (not shown) disposed outside the optical element driving mechanism 1. The circuit board 80 is electrically connected to the driving coils 40 through the connecting member 202, and the circuit board 80 transmits the electrical signals emitted from the circuit unit to the driving coils 40 to perform an auto-focusing (AF) function.

FIG. 3A is a cross-sectional view illustrating the optical element driving mechanism 1 along line A-A' in FIG. 1. As shown in FIGS. 2 and 3A, the holding unit 30 is movably connected to the housing 10 and the base unit 20. To be more specific, the holding unit 30 may be connected to the frame 50 through the upper leaf spring 70, the holding unit 30 may also be connected to the base unit 20 through the lower leaf spring 72, the upper leaf spring 70 and the lower leaf spring 72 are metallic materials. Therefore, the holding unit 30 is movably suspended between the frame 50 and the base unit 20.

Two magnetic elements 60 and two corresponding driving coils 40, which are located outside the holding unit 30, may constitute an optical element driving assembly EM. When a current is applied to the driving coils 40 through the connecting member 202 and the circuit board 80 (See FIG. 3B), an electromagnetic driving force may be generated by the driving coils 40 and the magnetic elements 60 to drive the holding unit 30 and the optical element OE to move along Z-axis direction (the optical axis O direction) relative to the base unit 20. Therefore, the auto-focusing (AF) function is performed.

FIG. 3B is a cross-sectional view illustrating the optical element driving mechanism 1 along line B-B' in FIG. 1. As shown in FIG. 3B, the circuit board 80 may transmit the electrical signal from the external circuit unit to the two driving coils 40 (See FIG. 3A), which are located outside the holding unit 30, through the connecting member 202, the lower leaf spring 72, and a wire 31. Therefore, the movement of the holding unit 30 in Z-axis direction is controlled.

In addition, a magnetic field sensing element 82 may also be disposed on and electrically connected to the circuit board 80. The magnetic field sensing element 82 is, for example, a Hall effect sensor, a magnetoresistive (MR) sensor, such as a giant magnetoresistive (GMR) sensor or a tunnel magnetoresistive (TMR) sensor, or a fluxgate. The magnetic field sensing element 82 may be configured to detect magnetic field change of the sensing magnet 90, which is disposed on the holding unit 30, to obtain the displacement of the holding unit 30 in the Z-axis direction (the optical axis O direction) relative to the base unit 20. The circuit board 80 and the magnetic field sensing element 82 are disposed on one side of the optical element driving mechanism 1, which is different from that of the optical element driving mechanism 1 where the optical element driving assembly EM (including the magnetic elements 60 and the driving coils 40) are disposed. Therefore, electromagnetic interference may be avoided, and the inner space of the optical element driving mechanism 1 may be fully utilized.

Figure 4A:
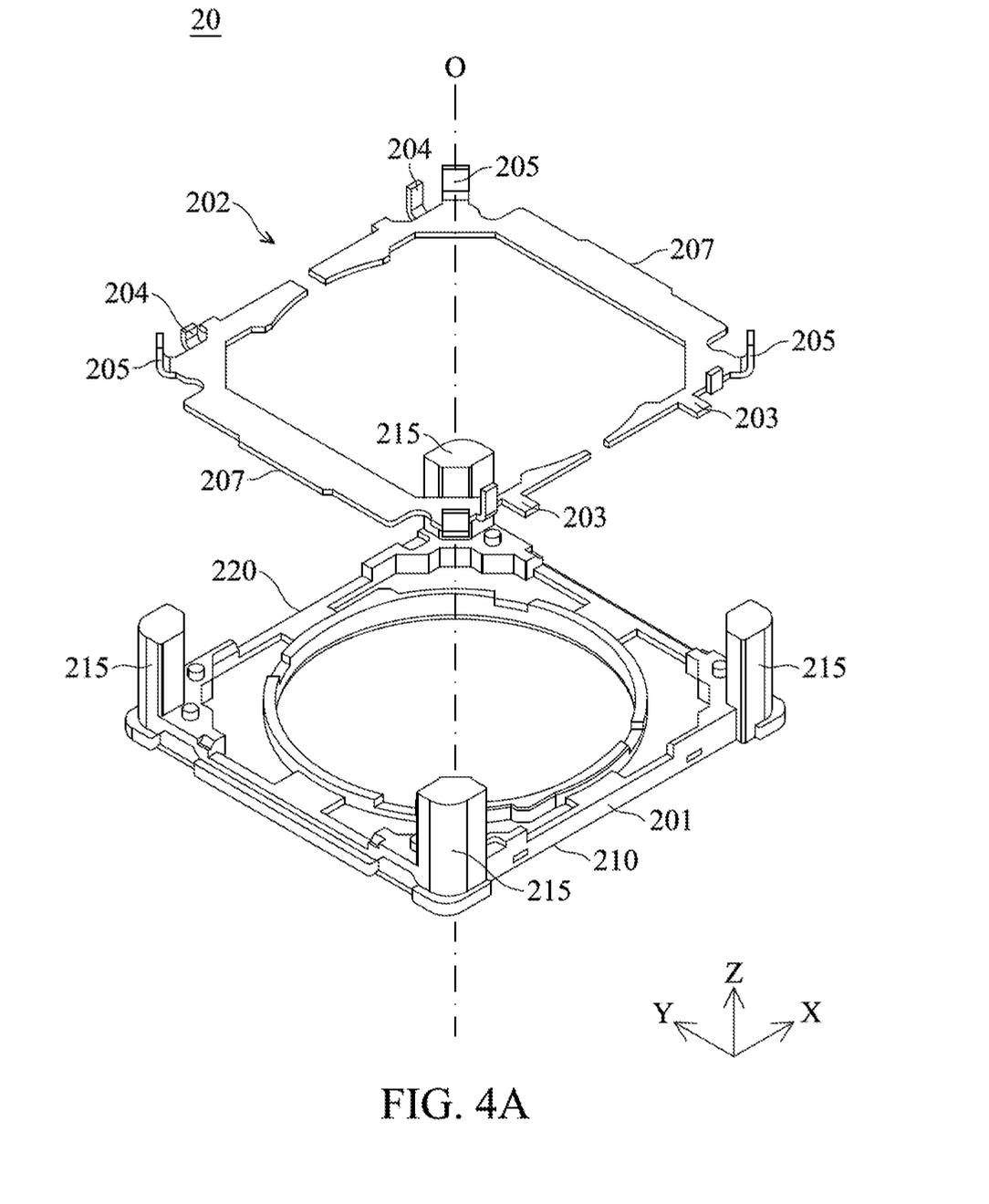
FIG. 4A is a schematic perspective view illustrating a body and a connecting member of a base unit separated from each other in accordance with an embodiment of the present disclosure.
Figure 4B:
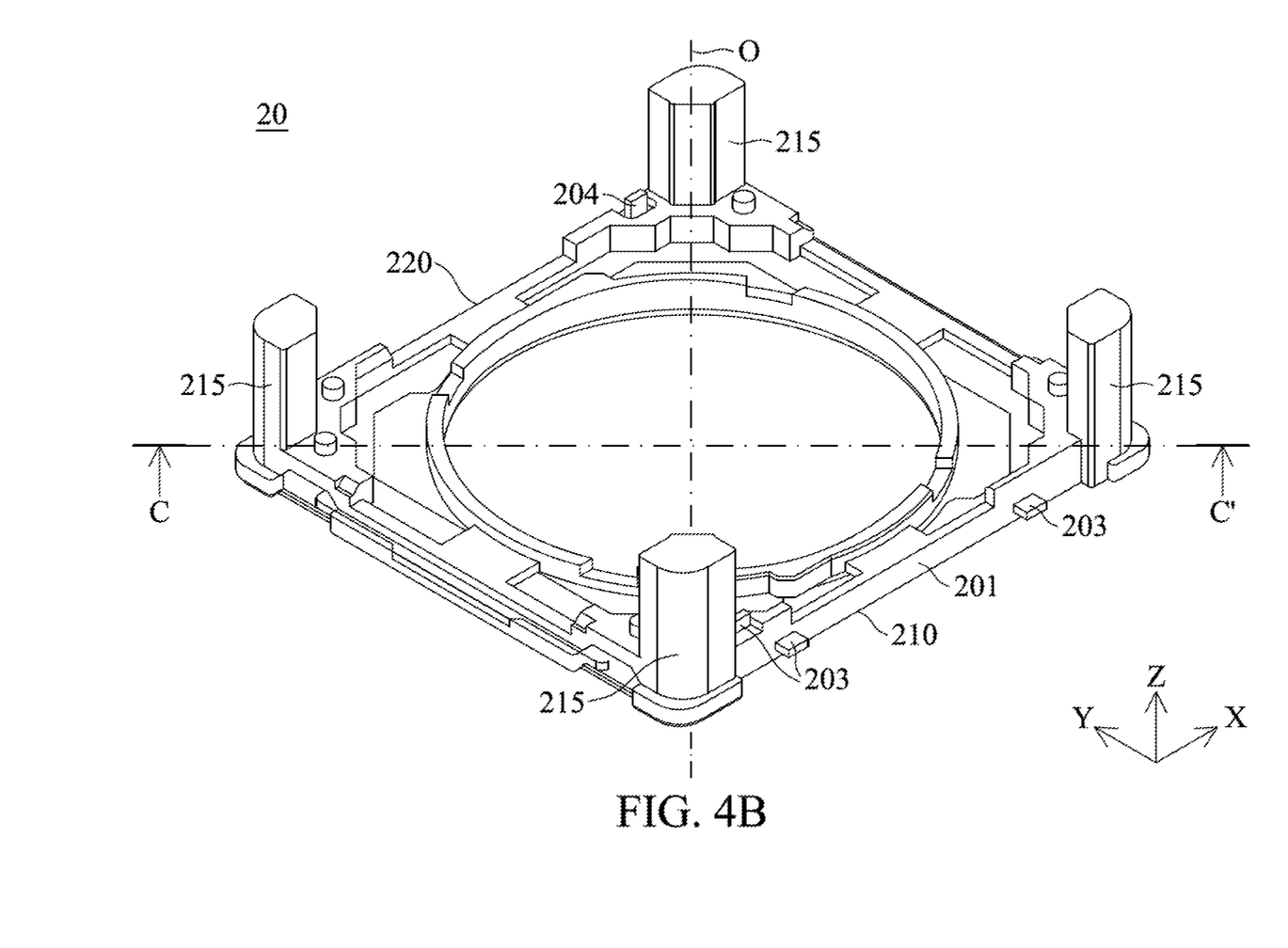
FIG. 4B is a schematic perspective view illustrating the body and the connecting member shown in FIG. 4A after assembly.

Referring to FIGS. 4A and 4B, FIG. 4A is a schematic perspective view illustrating the body 201 and the connecting member 202 of the base unit 20 separated from each other in accordance with an embodiment of the present disclosure, and FIG. 4B is a schematic perspective view illustrating the body 201 and the connecting member 202 shown as the embodiment in FIG. 4A after assembly. As shown in FIGS. 4A and 4B, protruding structures 215 are disposed on the body 201, and are located at corners of the body 201. The protruding structures 215 are configured to strengthen the structural strength at the corners of the optical element driving mechanism, and can protect inner elements of the optical element driving mechanism. In this embodiment, the protruding structures 215 are, for example, plastic materials.

The connecting member 202 may have two separate portions, wherein each of the portions of the connecting member 202 individually includes a circuit portion 207 and at least one strengthening portion 205. The circuit portion 207 has at least one first contact 203 and at least one second contact 204. The first contact 203 is disposed on a first side 210 of the base unit 20 (that is, a first side of the circuit portion 207), and is electrically connected to the circuit unit (not shown) disposed outside the optical element driving mechanism 1. The second contact 204 is disposed on a second side 220 of the base unit 20 (that is, a second side of the circuit portion 207), and is electrically connected to the lower leaf spring 72 (See FIG. 3B). That way, the external circuit unit may transmit electrical signals to the circuit board 80. Then, the electrical signals may be transmitted to the lower leaf spring 72 through the connecting member 202. Finally, the electrical signals may be transmitted to the driving coils 40 through the wire 31 (See FIG. 3B) to control the holding unit 30 to move along Z-axis direction (the optical axis O direction). Thus, the auto-focusing function is performed.

In this embodiment, the first contact 203 and the second contact 204 are respectively disposed on the opposite first side 210 and the second side 220 of the base unit 20 (i.e. opposite sides of the circuit portion 207). In some other embodiments, the first contact 203 and the second contact 204 may also be disposed on adjacent sides of the base unit 20 (i.e. adjacent sides of the circuit portion 207). It should be appreciated that, in the assembly of the optical element driving mechanism, the second contact 204 is first welded to the lower leaf spring 72 located in the optical element driving mechanism, and then the first contact 203 is welded to the circuit board 80, which is electrically connected to the external circuit unit.

As shown in FIGS. 4A and 4B, since the first contact 203 and the second contact 204 are separated from a sufficient distance, when the optical element driving mechanism 1 is connected to the external circuit unit (that is, the first contact 203 is soldered with the circuit board 80), the weld joint between the second contact 204 and the lower leaf spring 72 in the optical element driving mechanism 1 can be prevented from being damaged due to high temperature and high pressure in welding. Therefore, the second contact 204 and the lower leaf spring 72 are avoided being separate because of insufficient welding strength. Generally, the distance between the first contact 203 and the second contact 204 in the horizontal direction (that is a direction perpendicular to the Z-axis and the optical axis O) has to be greater than half of the length of the shortest side of the base unit 20 to effectively achieve the effect of avoiding having the different welding steps affect each other. It should be appreciated that the term "the shortest side" is referred to as the side which is the shortest one among all the side of the base unit 20.

Figure 4C:
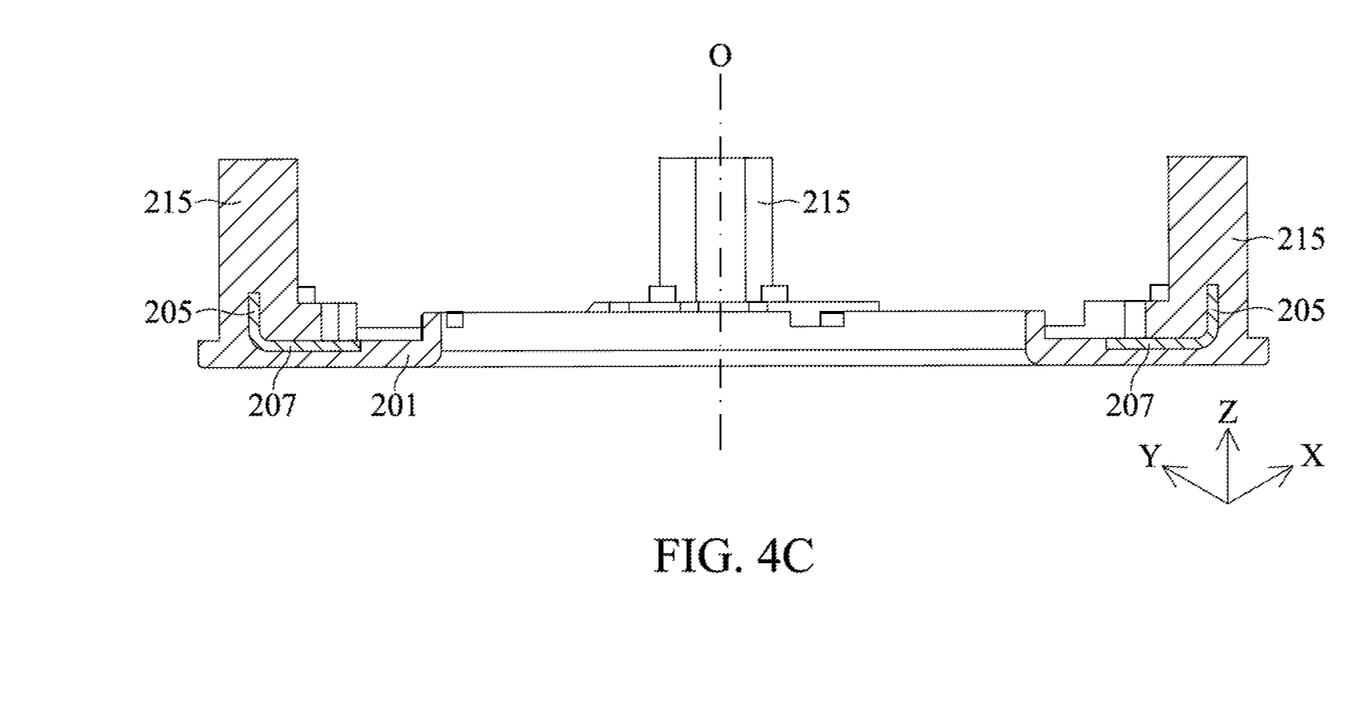
FIG. 4C is a cross-sectional view illustrating the body and the connecting member along line C-C' in FIG. 4B.

Furthermore, FIG. 4C is a cross-sectional view illustrating the body 201 and the connecting member 202 along line C-C' in FIG. 4B. As shown in FIG. 4C, the connecting member 202 further includes at least one strengthening portion 205 located at a corner of the base unit 20. In this embodiment, the strengthening portion 205 extends along Z-axis direction (the optical axis O direction), and the strengthening portion 205 is embedded in the protruding structure 215, which corresponds to the strengthening portion 205, over the body 201. When struck by an external force, the protruding structure 215 may be deformed less by arranging the strengthening portion 205 and the corresponding protruding structure 215. Therefore, the effect of strengthening the base unit 20 is achieved.

Figure 5A:
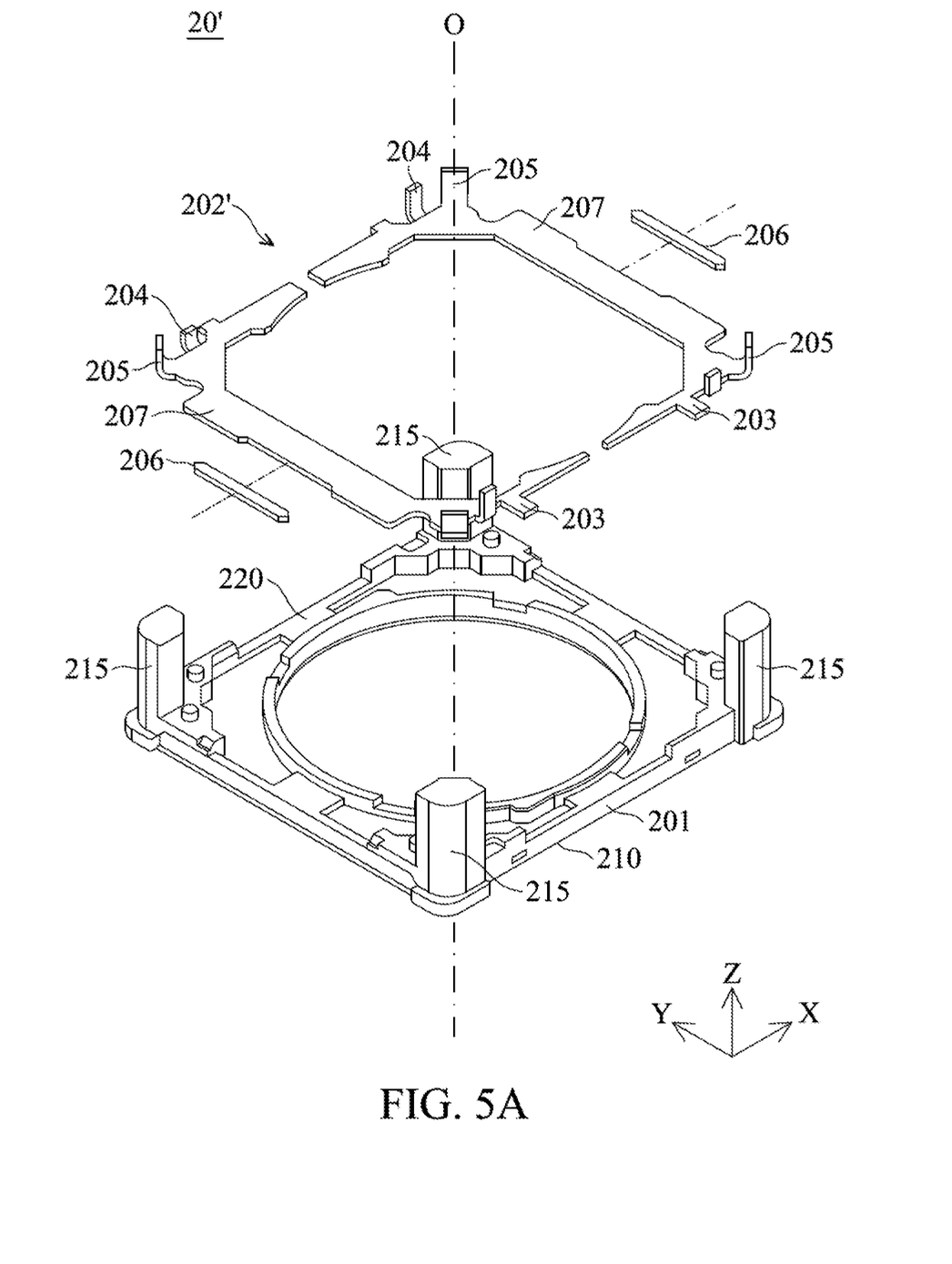
FIG. 5A is a schematic perspective view illustrating the body and the connecting member of the base unit separated from each other in accordance with another embodiment of the present disclosure.
Figure 5B:
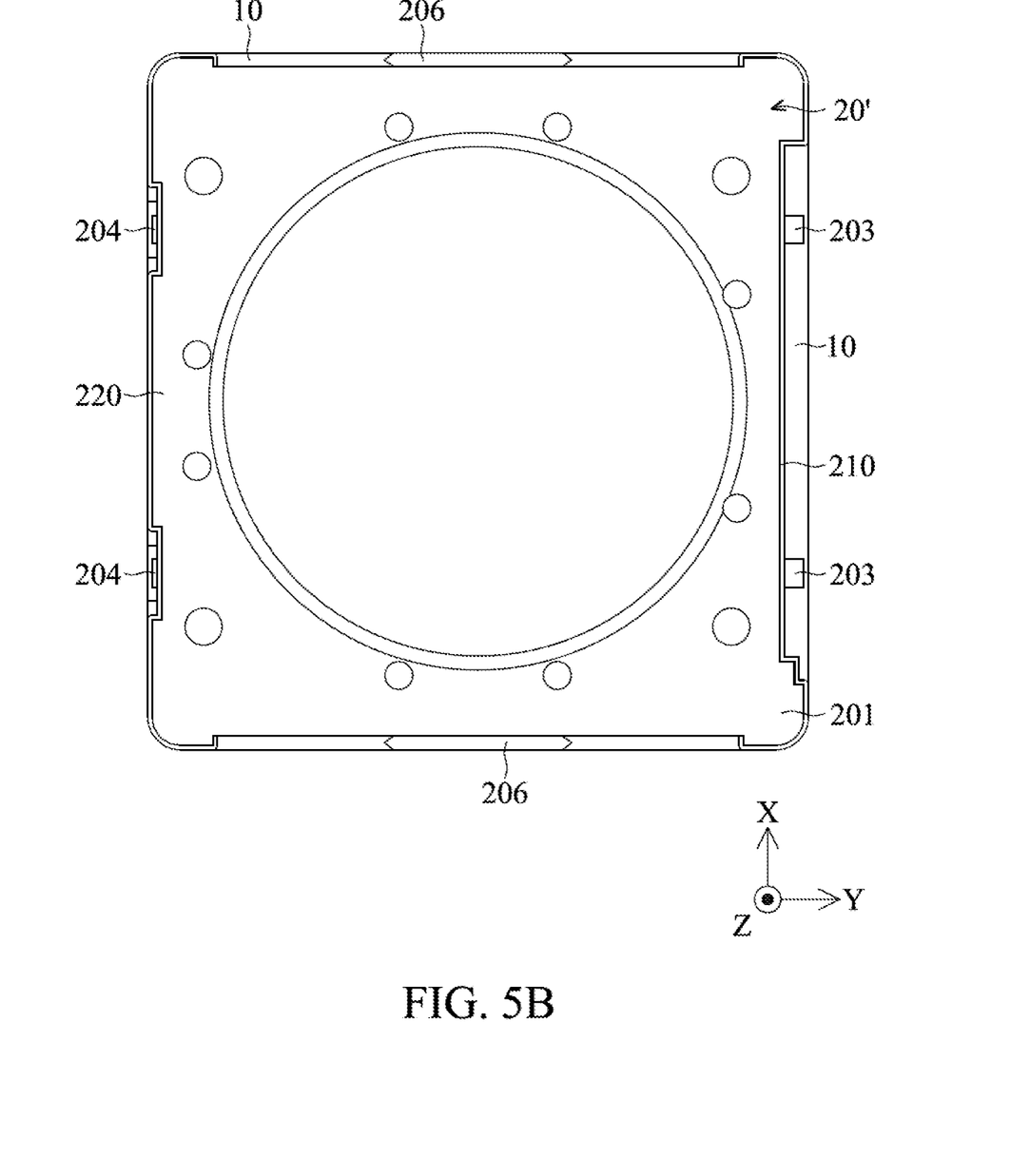
FIG. 5B is a schematic bottom view illustrating the body, the connecting member in FIG. 5A, and the housing after assembly.
Figure 5C:
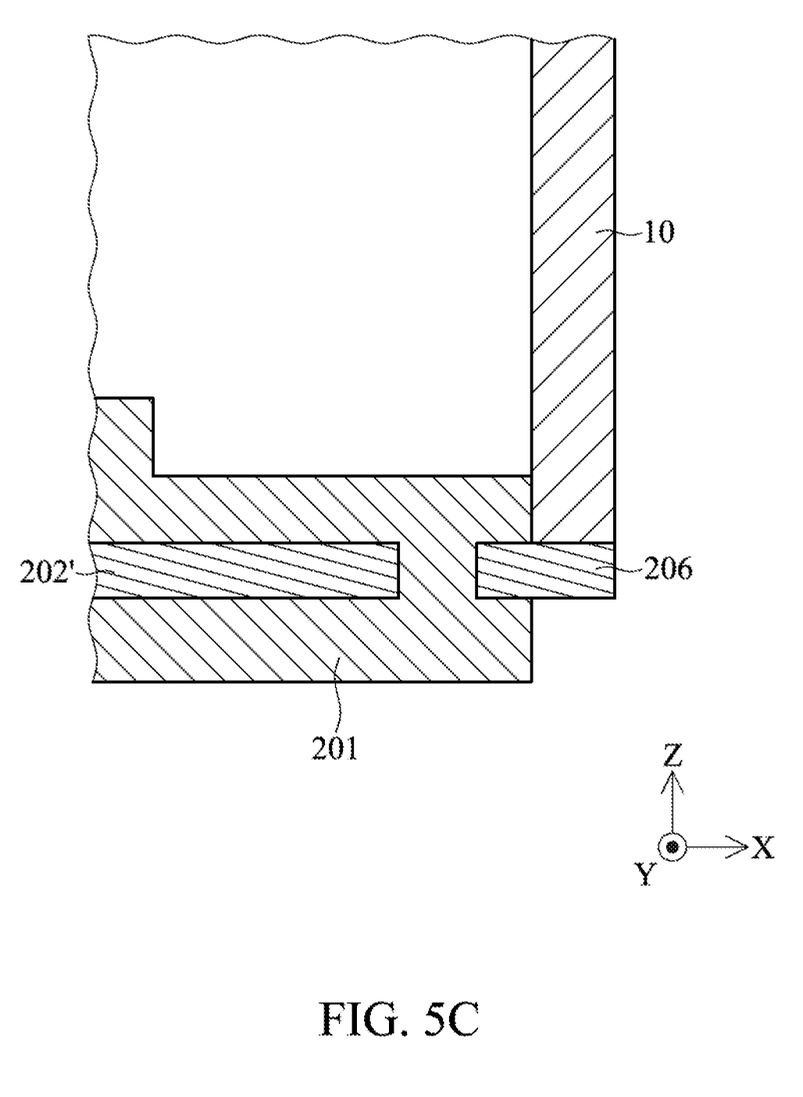
FIG. 5C is a partial cross-sectional view illustrating the base unit and the housing in accordance with an embodiment of the present disclosure.

Referring to FIGS. 5A to 5C, in accordance with another embodiment of the present disclosure, the optical element driving mechanism may have a base unit 20' or 20", replacing the base unit 20, wherein the base unit 20' or 20" may include the same elements as the base unit 20. The same elements will be shown as the same numerals, and will not be repeated in the following description. FIG. 5A is a schematic perspective view illustrating the body 201 and the connecting member 202' of the base unit 20' separated from each other in accordance with another embodiment of the present disclosure, FIG. 5B is a schematic bottom view illustrating the body 201, the connecting member 202' in FIG. 5A, and the housing 10 after assembly, and FIG. 5C is a partial cross-sectional view illustrating the base unit 20' and the housing 10 in accordance with an embodiment of the present disclosure. It should be understood that the difference between the connecting member 202' in this embodiment and the connecting member 202 shown in FIG. 4A is that the connecting member 202' has recesses on opposite sides of the base unit 20' to provide spaces for contact members 206. A detailed description of the contact members 206 is provided below.

As shown in FIGS. 5A to 5C, the base unit 20' further includes the contact members 206, which are located on the opposite sides of the base unit 20' without arranging the first contact 203 and the second contact 204. The contact members 206 are configured to support the housing 10. It should be noted that a bottom surface of the contact members 206 may also contact other components (such as the circuit unit or photosensitive element module located outside the optical element driving mechanism 1), and thereby the mechanical strength of the optical element driving mechanism 1 can be significantly enhanced. The contact members 206 are electrically isolated from the circuit portion 207, which transmits electrical signals. Therefore, the contact members 206, which are in contact with the housing 10, are prevented from being energized so that a short circuit would not be generated. It should be noted that the contact members 206 and the circuit portion 207 may be formed in the body 201 in single insert molding process. Therefore, the contact members 206 and the circuit portion 207 may be located on the same level (that is, on the same XY-plane).

In addition, when observed from the bottom surface of the base unit 20' (FIG. 5B), it is shown that the contact members 206 protrudes from the body 201, but the contact members 206 do not exceed the range of the housing 10. Therefore, the miniaturization of the optical element driving mechanism is achieved. It should be understood that when it comes to observing from the bottom surface of the base unit, it means to observe the base unit from its bottom surface in Z-axis direction. At this time, the bottom surface of the base unit faces the observer. In this embodiment, the contact members 206 are located at central positions of the opposite sides of the base unit 20'. Furthermore, as shown in FIG. 5C, the sidewall of the contact member 206 and the outer sidewall of the housing 10 are located on the same vertical surface (that is perpendicular to XY-plane), wherein the metallic contact member 206 may be in direct contact with the housing 10, and may provide a supporting surface for the housing 10 to facilitate bonding the contact member 206 and the housing 10 by using an adhesive. Moreover, the overall structural strength of the optical element driving mechanism may be further enhanced by arranging the contact members 206, which correspond to the housing 10, in the base unit 20'. Therefore, the optical element driving mechanism may bear greater mounting strength and is unlikely to be damaged.

Figure 5D:
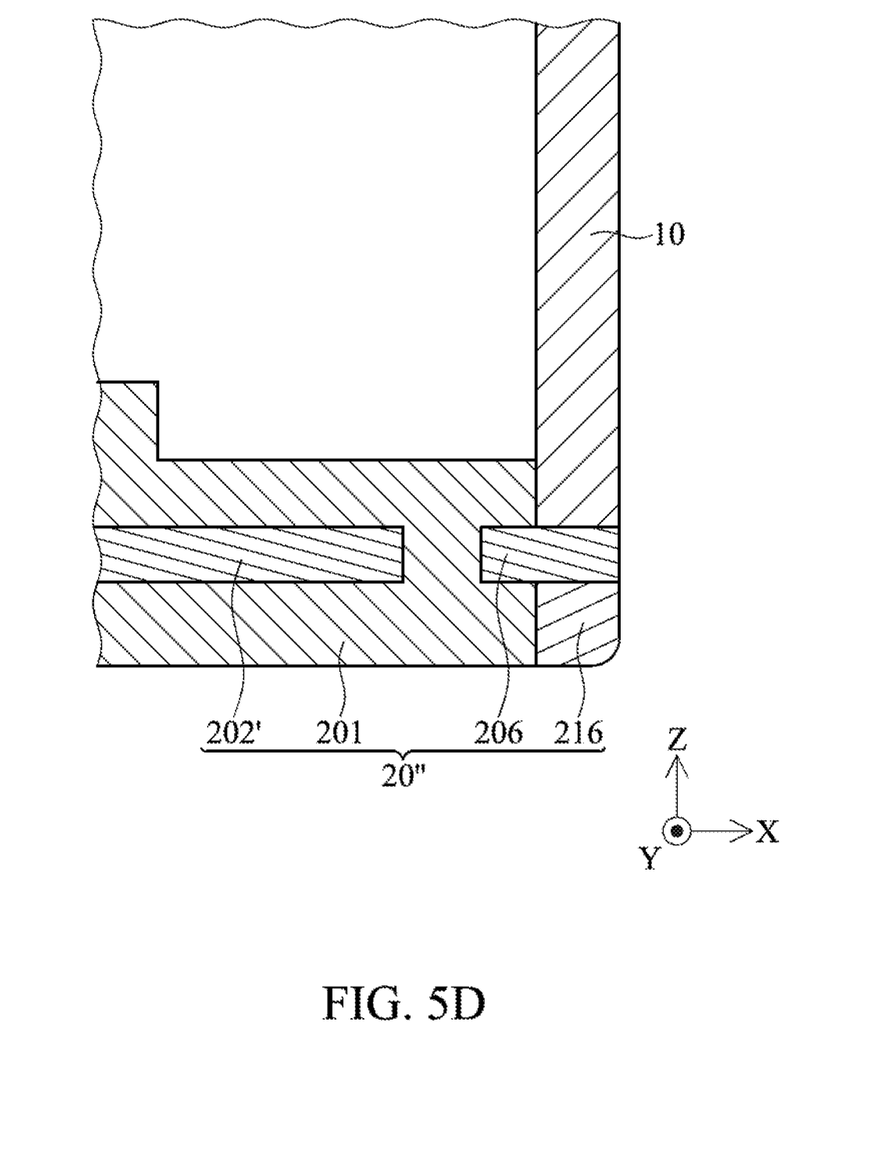
FIG. 5D is a partial cross-sectional view illustrating the base unit and the housing in accordance with another embodiment of the present disclosure.

Referring to FIG. 5D, FIG. 5D is a partial cross-sectional view illustrating the base unit 20" and the housing 10 in accordance with another embodiment of the present disclosure. The difference between the base unit 20" in this embodiment and the base unit 20' shown in FIGS. 5A to 5C is that, as shown in FIG. 5D, a supporting material 216 is formed below the portion of the contact member 206 protruding from the body 201. The supporting material 216 provides more stable support for the housing 10. In this embodiment, the supporting material 216 is, for example, a plastic material. It should be noted that, in some other embodiments, the supporting material 216 and the body 201 may also be integrally formed.

Figure 5E:
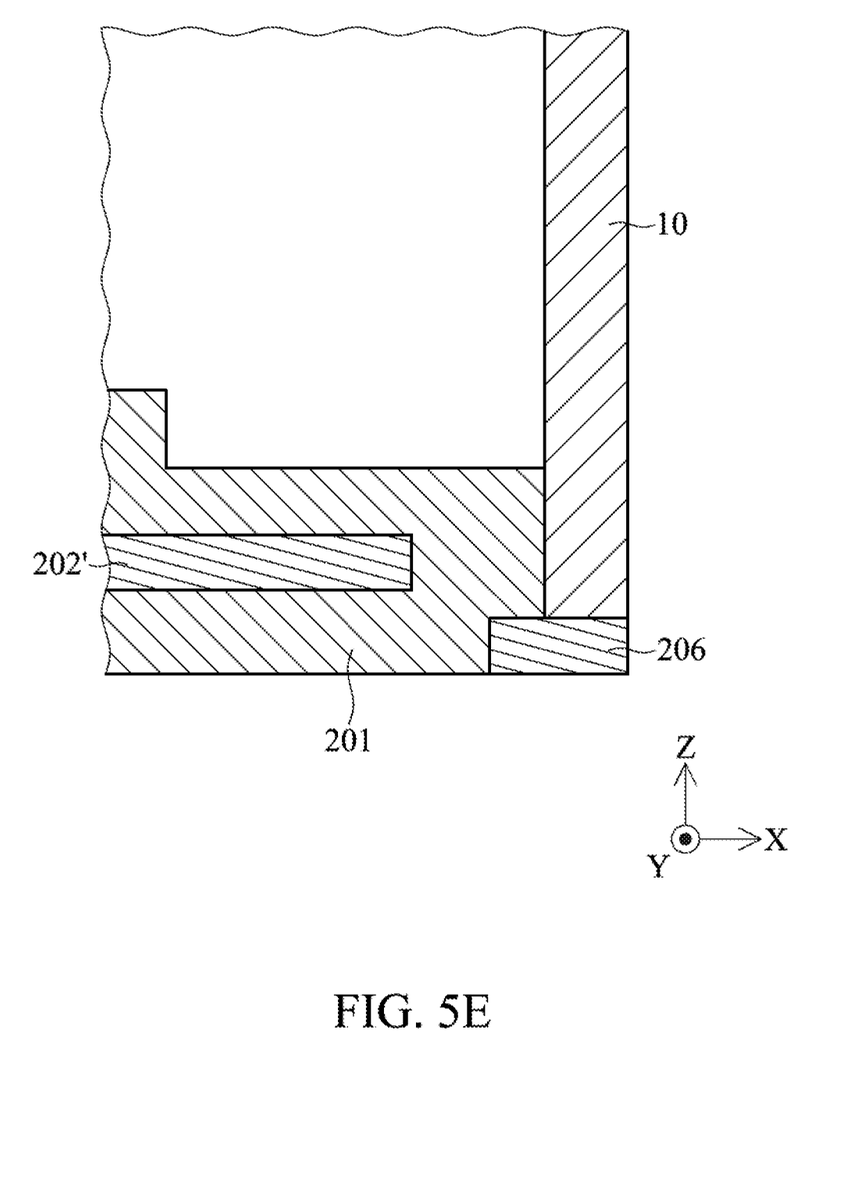
FIG. 5E is a partial cross-sectional view illustrating the base unit and the housing in accordance with another embodiment of the present disclosure.

Referring to FIG. 5E, FIG. 5E is a partial cross-sectional view illustrating the base unit 20' and the housing 10 in accordance with another embodiment of the present disclosure. The difference between the base unit 20' in this embodiment and the base unit 20' shown in FIGS. 5A to 5C is that the contact member 206 and the connecting member 202' are disposed on different levels (XY-planes). For example, the bottom surface of the contact member 206 is located on the same level with the bottom surface of the body 201. Therefore, the contact member 206 and the body 201 may contact the same component together on the bottom surfaces of the former two, and the structural strength of the optical element driving mechanism is enhanced.

In addition, in some other embodiments, the contact members 206 may also be disposed on four sides or at four corners of the base unit 20' (or the base unit 20"), and may be aligned with each of the corresponding sidewalls or corners of the housing 10. That way, the structural strength of the driving mechanism may also be enhanced. It should be noted that when the contact members 206 are disposed on the sides of the base unit 20', larger contact members 206 may be disposed. When the contact members 206 are disposed at the corners of the base unit 20', the stress can be concentrated such that the driving mechanism may bear greater mounting strength.

In some other embodiments, the portion of the contact members 206, which is embedded in the body 201, is designed to have multiple extending portions (not shown) extending in different directions. Therefore, the connection strength between the contact members 206 and the body 201 can be strengthened, and the overall structural strength of the base unit is also enhanced at the same time.

Furthermore, the contact members 206 may be selectively bonded to the housing 10 by welding (such as seam welding) or soldering. The contact members 206 and the housing 10, which are metallic materials, are in direct contact with each other, and the former two are welded or soldered together such that the structural strength of the optical element driving mechanism 1 can be further enhanced.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure, as long as may perform substantially the same function in the aforementioned embodiments and obtain substantially the same result may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. A driving mechanism driving an optical element, comprising:
   a holding unit holding the optical element;
   a base unit comprising a body and a connecting member, wherein the connecting member is formed in the body by insert molding;
   wherein the connecting member has a first contact and a second contact, the first contact and the second contact are disposed on different sides of the base unit, and the first contact is electrically connected to a circuit unit outside the driving mechanism, wherein the first contact and the second contact extend along different directions;
   an elastic element connecting the holding unit with the base unit, wherein the second contact is electrically connected to the elastic element, and the elastic element is electrically connected to the circuit unit via the connecting member; and
   a driving assembly electrically connected to the connecting member for driving the optical element to move relative to the base unit.

2. The driving mechanism as claimed in claim 1, wherein the first contact and the second contact are disposed on opposite sides of the base unit.

3. The driving mechanism as claimed in claim 1, further comprising a housing, wherein the base unit further comprises a contact member, and the contact member is in contact with the housing.

4. The driving mechanism as claimed in claim 3, wherein the connecting member further comprises a circuit portion electrically connected to the elastic element, and the circuit portion is electrically isolated from the contact member.

5. The driving mechanism as claimed in claim 3, wherein when observed from a bottom surface of the base unit, the contact member protrudes from the body, and the contact member does not exceed a range of the housing.

6. The driving mechanism as claimed in claim 3, wherein the contact member and the housing are bonded by welding or soldering.

7. The driving mechanism as claimed in claim 3, wherein the contact member and the connecting member are disposed on different levels.

8. The driving mechanism as claimed in claim 3, wherein a portion of the contact member is embedded in the body, and the portion of the contact member has a plurality of extending portions extending in different directions.

9. The driving mechanism as claimed in claim 1, wherein a distance between the first contact and the second contact in a direction, which is perpendicular to an optical axis of the optical element, is greater than half of the length of the shortest side of the base unit.

10. The driving mechanism as claimed in claim 1, wherein the connecting member further comprises a strengthening portion connected to the circuit portion, and the strengthening portion extends along an optical axis direction of the optical element.

11. The driving mechanism as claimed in claim 10, wherein the base unit further comprises a protruding structure disposed on the body, and the strengthening portion is embedded in the protruding structure.

12. The driving mechanism as claimed in claim 1, wherein the body is a plastic material, and the connecting member is a metallic material.

13. A base unit of the optical element driving mechanism, comprising:
    a body; and
    a connecting member disposed on the body, wherein the connecting member further comprises:
        two circuit portions disposed in the body and electrically separated from each other, wherein each of the circuit portions has a first side and a second side;
        a first contact disposed on the first side of the circuit portion; and
        a second contact disposed on the second side of the circuit portion, wherein the first contact and the second contact extend along different directions;
    wherein an elastic element is electrically connected to a circuit unit via the connecting member.

14. The base unit as claimed in claim 13, wherein the first side and the second side are adjacent or opposite sides.

15. The base unit as claimed in claim 13, wherein the connecting member further comprises a strengthening portion connected to the circuit portion.

16. The base unit as claimed in claim 15, further comprising a protruding structure disposed on the body, wherein the strengthening portion is embedded in the protruding structure.

17. The base unit as claimed in claim 13, further comprising a contact member, wherein the circuit portion is electrically isolated from the contact member.

18. The base unit as claimed in claim 17, wherein when observed from a bottom surface of the body, the contact member protrudes from the body.

19. The base unit as claimed in claim 17, wherein the contact member and the connecting member are disposed on different levels.

20. The base unit as claimed in claim 13, wherein the body is a plastic material, and the connecting member is a metallic material.

* * * * *